United States Patent
Wang et al.

(10) Patent No.: US 10,337,322 B2
(45) Date of Patent: *Jul. 2, 2019

(54) MODULAR RESISTIVITY SENSOR FOR DOWNHOLE MEASUREMENT WHILE DRILLING

(71) Applicant: WELL RESOLUTIONS TECHNOLOGY, Houston, TX (US)

(72) Inventors: Tsili Wang, Houston, TX (US); Borislav J. Tchakarov, Houston, TX (US)

(73) Assignee: Well Resolutions Technology, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,220

(22) Filed: Mar. 22, 2017

(65) Prior Publication Data

US 2018/0024266 A1    Jan. 25, 2018

Related U.S. Application Data

(63) Continuation of application No. 14/307,293, filed on Jun. 17, 2014, now Pat. No. 9,638,819.

(60) Provisional application No. 61/836,577, filed on Jun. 18, 2013.

(51) Int. Cl.
| | |
|---|---|
| *G01V 3/00* | (2006.01) |
| *E21B 49/00* | (2006.01) |
| *E21B 47/01* | (2012.01) |
| *E21B 47/12* | (2012.01) |
| *G01V 3/28* | (2006.01) |
| *E21B 47/024* | (2006.01) |

(52) U.S. Cl.
CPC .......... *E21B 49/003* (2013.01); *E21B 47/011* (2013.01); *E21B 47/024* (2013.01); *E21B 47/12* (2013.01); *E21B 47/122* (2013.01); *G01V 3/00* (2013.01); *G01V 3/28* (2013.01)

(58) Field of Classification Search
None
See application file for complete search history.

(56) References Cited

U.S. PATENT DOCUMENTS

| | | | |
|---|---|---|---|
| 5,235,285 | A | 8/1993 | Clark et al. |
| 5,293,128 | A | 3/1994 | Zhou |
| 5,331,331 | A | 7/1994 | Wu |
| 5,339,036 | A | 8/1994 | Clark et al. |
| 5,339,037 | A | 8/1994 | Bonner et al. |
| 5,631,563 | A | 5/1997 | Moriarty |
| 6,100,696 | A | 8/2000 | Sinclair |
| 6,703,837 | B1 | 3/2004 | Wisler et al. |
| 6,957,708 | B2 | 10/2005 | Chemali et al. |
| 7,250,768 | B2 | 7/2007 | Ritter et al. |

(Continued)

*Primary Examiner* — Douglas X Rodriguez
(74) *Attorney, Agent, or Firm* — Gregory L. Porter; Lloyd L. Davis; Hunton Andrews Kurth LLP

(57) ABSTRACT

A resistivity-measuring sensor disposable within a drillstring includes a sensor body having a longitudinal axis, wherein the sensor body is separable from and disposable in the drillstring at a radially offset distance from the longitudinal axis of the drillstring. The sensor further includes a transmitting antenna disposed along a length of the sensor body, a receiving antenna disposed along a length of the sensor body, and an electronics section contained within the sensor body for generating and receiving signals to and from the transmitting and receiving antennas.

14 Claims, 6 Drawing Sheets

(56) References Cited

U.S. PATENT DOCUMENTS

| | | |
|---|---|---|
| 7,345,487 B2 | 3/2008 | Bittar |
| 7,420,367 B2 | 9/2008 | Bespalov et al. |
| 7,600,420 B2 * | 10/2009 | Meek ..................... E21B 17/10 |
| | | 73/152.54 |
| 7,723,991 B2 | 5/2010 | Signorelli et al. |
| 8,129,994 B2 | 3/2012 | Wang |
| 8,319,498 B2 | 11/2012 | Wang |
| 8,364,406 B2 * | 1/2013 | Gleitman .............. E21B 17/003 |
| | | 702/11 |
| 2005/0001624 A1 | 1/2005 | Ritter et al. |
| 2006/0011385 A1 | 1/2006 | Seydoux et al. |
| 2006/0017442 A1 | 1/2006 | Folberth |
| 2007/0030007 A1 | 2/2007 | Moore |
| 2008/0224707 A1 | 9/2008 | Wisler et al. |
| 2008/0265893 A1 | 10/2008 | Snyder et al. |
| 2008/0294344 A1 * | 11/2008 | Sugiura ................ E21B 47/024 |
| | | 702/6 |
| 2009/0302851 A1 | 12/2009 | Bittar et al. |
| 2011/0156710 A1 | 6/2011 | Wang |
| 2011/0316542 A1 | 12/2011 | Frey et al. |
| 2014/0136114 A1 * | 5/2014 | Liu ......................... G01V 3/28 |
| | | 702/7 |
| 2015/0160365 A1 * | 6/2015 | Donderici ........... E21B 47/0905 |
| | | 324/351 |

\* cited by examiner

MODULAR RESISTIVITY SENSOR FOR DOWNHOLE MEASUREMENT WHILE DRILLING

CROSS-REFERENCE TO RELATED APPLICATIONS

This application is a continuation of U.S. Ser. No. 14/307,293, filed Jun. 17, 2014, and allowed Jan. 17, 2017, which claims priority under 35 U.S.C. § 119(e) to U.S. Provisional Application No. 61/836,577 filed Jun. 18, 2013, which is incorporated herein by reference in its entirety.

FIELD

Embodiments disclosed herein relate to, for example, apparatus and methods for making electromagnetic resistivity measurements. More particularly, embodiments disclosed herein relate to a resistivity measuring apparatus and methods employing a modular resistivity sensor.

BACKGROUND AND SUMMARY

Well logging, also known as borehole logging, is the practice of making a detailed record (a well log) of the geologic formations penetrated by a borehole. Resistivity logging is a method of well logging that works by characterizing the rock or sediment in a borehole by measuring its electrical resistivity. Resistivity is a fundamental material property which represents how strongly a material opposes the flow of electric current. Most rock materials are essentially insulators, while their enclosed fluids are conductors. Hydrocarbon fluids are an exception, because they are almost infinitely resistive. When a formation is porous and contains salty water, the overall resistivity will be low. When the formation contains hydrocarbons, or contains very low porosity, its resistivity will be high. High resistivity values may indicate a hydrocarbon bearing formation.

In one aspect, embodiments disclosed herein relate a resistivity-measuring sensor disposable within a drillstring. The sensor includes a sensor body having a longitudinal axis, wherein the sensor body is separable from and disposable in the drillstring at a radially offset distance from the longitudinal axis of the drillstring. The sensor further includes a transmitting antenna disposed along a length of the sensor body, a receiving antenna disposed along a length of the sensor body, and an electronics section contained within the sensor body for generating and receiving signals to and from the transmitting and receiving antennas.

DETAILED DESCRIPTION

A downhole resistivity measuring tool suitable for use in any downhole environment is disclosed. A drill bit is secured to the lower end of the drillstring or drill tool body for drilling a rock formation. The measuring tool includes a modular resistivity measurement sensor. The modular resistivity sensor includes a sensor body with a longitudinal axis. At least part of the body may be made of non-conducting material such as rubber, PEEK, fiberglass, ceramic, or others. The sensor body provides no fluid conduit within for passage of drilling fluids (e.g., drilling mud). At least one transmitting coil antenna and at least one receiving coil antenna are disposed in/about the sensor body. The transmitting and receiving coil antennas each include one or multiple turns of wire wound about the sensor body. At least one coil antenna generates a magnetic moment in a direction parallel to the longitudinal axis of the sensor body. The receiving coil antenna may generate a magnetic moment in a direction parallel to or at an angle (e.g., orthogonal) with respect to the longitudinal axis of the sensor body. The sensor body may further include an electronics section for generating and receiving electromagnetic signals to and from the transmitting and receiving antennas. The electronics section is preferably contained in the sensor body, but it may also be contained at a separate location.

Resistivity measuring tools use an electric coil to generate an alternating current loop in the formation by induction (e.g., firing a transmitting coil). The alternating current loop, in turn, induces a voltage signal in a receiving coil located elsewhere in the tool. The voltage signal induced in the receiving coil is related to a parameter of the formation. Multiple transmitting and receiving coils may be used to focus formation current loops both radially (depth of investigation) and axially (vertical resolution).

Figure 1:
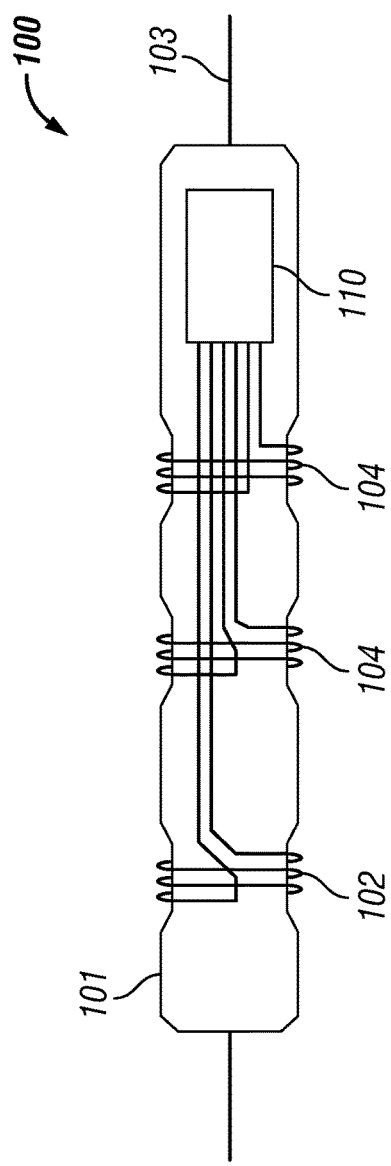
FIG. 1 illustrates an embodiment of a modular resistivity sensor.

FIG. 1 illustrates an embodiment of a modular resistivity sensor 100. The sensor 100 includes a sensor body 101 having a longitudinal axis 103, and one or more coil antennas wound about the sensor body 101. As shown, a transmitting coil antenna 102 and two receiving coil antennas 104 are wound about the sensor body 101. Any number of coil antennas may be used. For example, although the exemplary sensor shown employs only one transmitting coil antenna, it is possible to use multiple transmitting coil antennas. For instance, a second transmitting coil antenna may be added to the sensor body on the other side of the receiving coil antenna array. The two transmitting coil antennas may be symmetrical or asymmetrical with respect to the receiving coil antennas. The two transmitting coil antennas may be energized independently or jointly. The receiving coil antennas 104 may be spaced by at least two inches, or at least three inches, or at least six inches, or at least ten inches, or greater. The transmitting coil antenna 102 may be spaced from the receiving coil antennas 104 by a few inches to a few feet, such as at least three inches, or at least ten inches, at least one foot, at least two feet, or at least three feet, or greater.

An electronics section 110 may be included in the sensor body 101 for transmitting or receiving electromagnetic energy to and from the coil antennas. The electronics section 110 may be powered internally (e.g., batteries) or externally by another tool sub. The electronics section 110 may be equipped with a micro controller and an optional memory device. The acquired data may be stored in the memory and/or transmitted to a remote location (e.g., a nearby measurement-while-drilling sub) for transmission to the surface.

Figure 2:
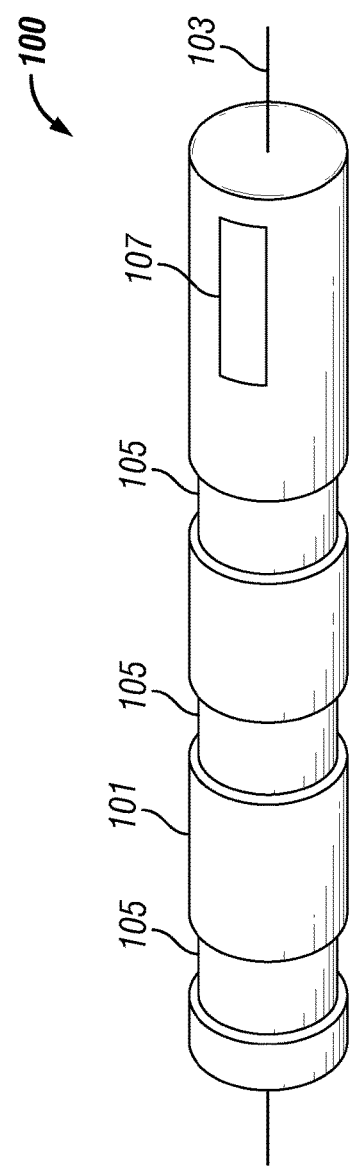
FIG. 2 illustrates an embodiment of a sensor body of the modular resistivity sensor depicted in FIG. 1.

FIG. 2 illustrates a perspective view of the sensor body 101 depicted in FIG. 1. In one embodiment, the sensor body 101 may be made of steel or other metal. The sensor body 101 may be cylindrical, but also may be other shapes. The diameter of the sensor body 101 may be at least one-half inch, or at least one inch, or at least two inches, or at least four inches, or greater. Preferably, the sensor body diameter is between approximately one and two inches. Antenna grooves 105 may be formed in an outer surface around a circumference of the sensor body 101 for each coil antenna. The antenna grooves 105 may be any depth, although preferably around 0.25 inches, or at least 0.50 inches, or at least 0.75 inches. An insulation layer of any thickness may be deposited in the antenna grooves 105, over which the coil antenna wire is wound. The electronics is housed in an electronics pocket, and the electronics section may be sealed within the pocket from ambient pressure by a pocket cover 107 equipped with O-rings. The pocket cover 107 is secured to the sensor body 101 by bolts, screws, rivets, or other fastening means (not shown). The communication wires from the coil antennas to the electronics section 110 may enter the electronics pocket through pressure-sealed feed-thrus (not shown). The feed-thrus are preferably placed near the respective coil antennas.

Figure 3:
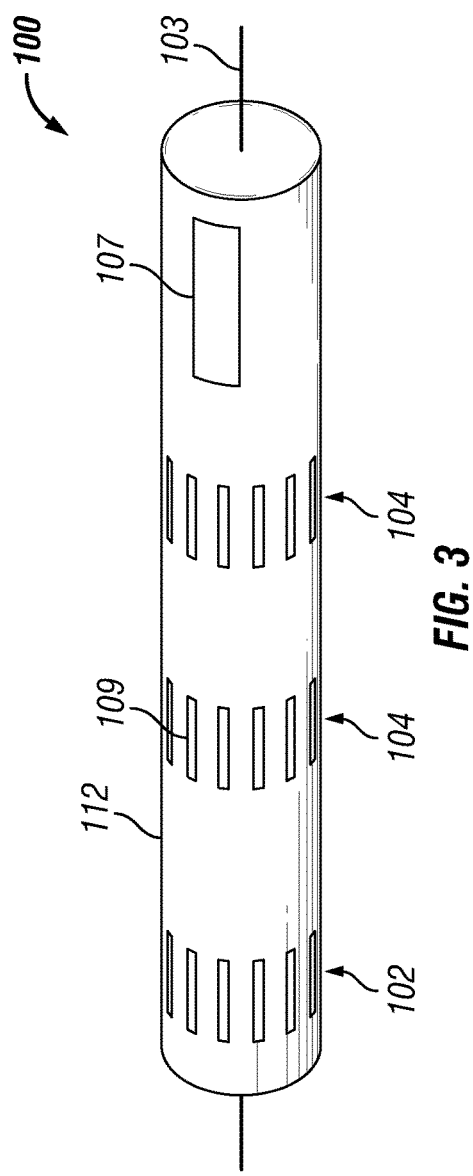
FIG. 3 illustrates an embodiment of a sensor cover of the modular resistivity sensor depicted in FIG. 1.

FIG. 3 illustrates a sensor sleeve 112 in the shape of a hollow tube into which the sensor body and coil antennas may be inserted for protection of the coil antenna wire. The sleeve 112 may be in the shape of a cylinder and may be made of non-conducting material (e.g., plastic or rubber) or conducting material (e.g., steel). For a steel tube, windows or slots 109 may be formed through an outer wall of the tube in locations where coil antennas reside so that electromagnetic energy can escape or enter the tube. For maximum transmission of electromagnetic energy through the tube, the slots may be substantially aligned along the direction of magnetic moments generated by respective coil antennas underneath. For example, for a coil antenna generating a magnetic moment parallel with a longitudinal axis of the sensor body 101, the slots 109 may be substantially aligned parallel to the longitudinal direction of the sensor body.

Although the coil antenna grooves 105 and the electronics pocket 107 are shown to be deposited within the same sensor body 101, in alternative embodiments, the sensor body may include two sub-bodies, one for the coil antennas and the other for the electronics section. The coil antenna sub-body may be made completely out of non-conducting material such as rubber, PEEK, fiberglass, or ceramic. In this case, the insulation layer in each antenna groove may or may not be used without affecting the transmission or reception of electromagnetic energy by each antenna. If needed, the two sub-bodies may be connected to each other by bolts, screws, or other fasteners to form a single sensor body.

Figure 4:
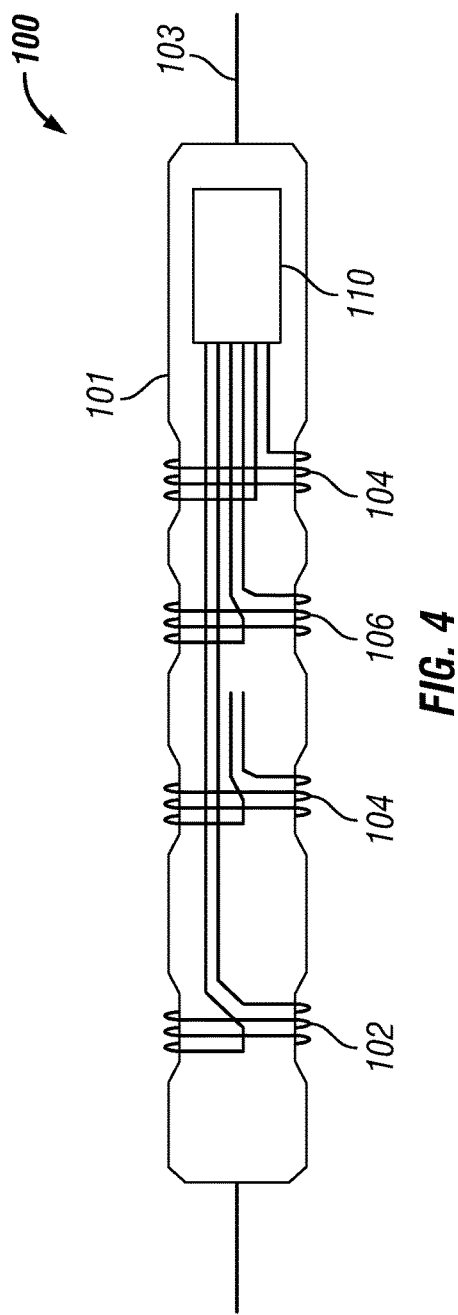
FIG. 4 illustrates an embodiment of a modular resistivity sensor including a calibrating antenna.

FIG. 4 illustrates a further embodiment of a modular resistivity sensor 100. The sensor 100 includes a sensor body 101 having a longitudinal axis 103, and one or more coil antennas wound about the sensor body 101. As shown, a transmitting coil antenna 102 and two receiving coil antennas 104 are wound about the sensor body 101. The sensor 100 also includes a calibrating coil antenna 106 wound about the sensor body 101. The calibrating coil antenna 106 is disposed between the two receiving coil antennas 104. Preferably, the calibrating coil antenna 106 is equally spaced between the receiving antennas 104, but may also be unequally spaced. Methods of using the calibrating antenna are described below.

Figure 5:
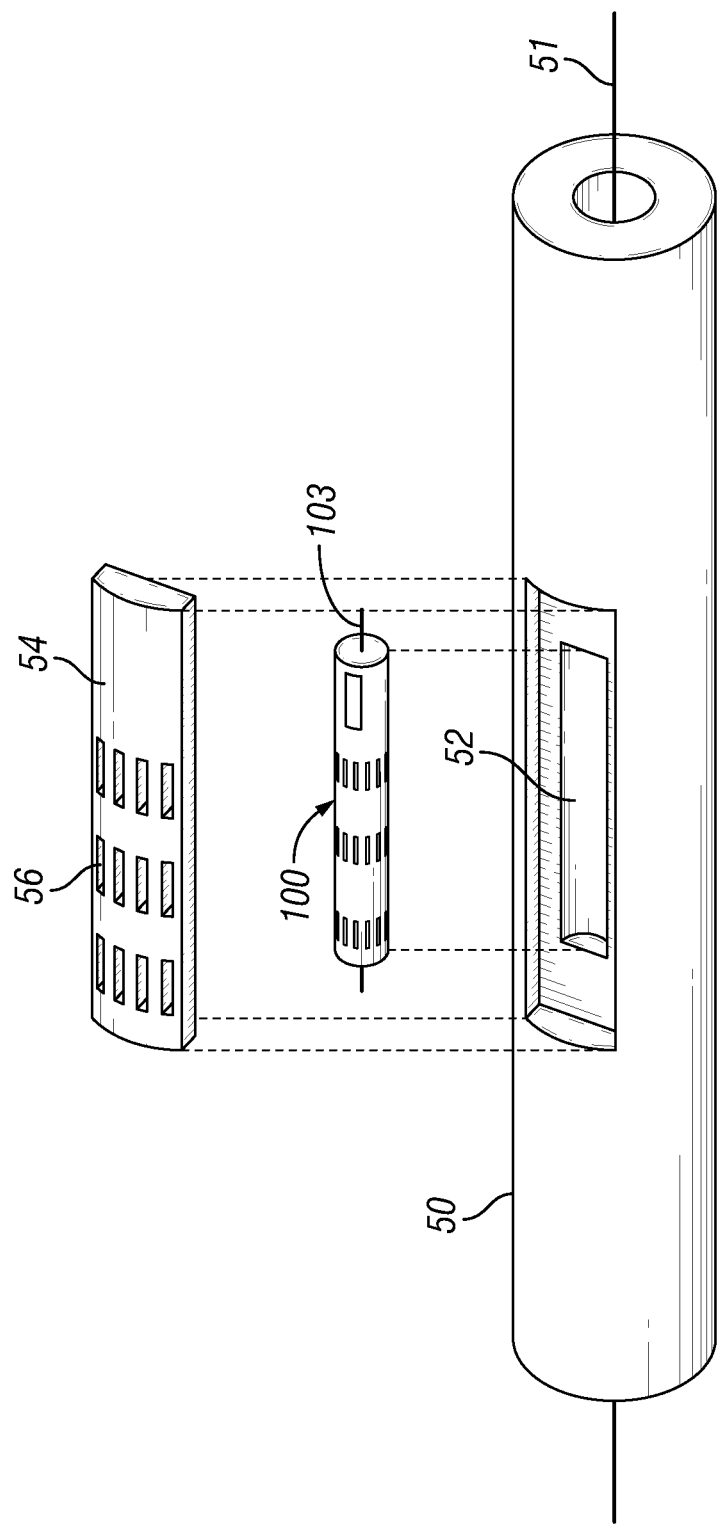
FIG. 5 illustrates an embodiment of a modular resistivity sensor assembly within a tool body.

FIG. 5 illustrates an embodiment of the modular resistivity sensor 100 assembled within a bottomhole assembly (BHA) or tool body 50. The BHA 50 has a longitudinal axis 51. The modular resistivity sensor 100 may be disposed near the outer surface of the tool body 50. In one embodiment, a radially outermost surface of the modular resistivity sensor is at a distance from the longitudinal axis of the tool body substantially equal to or less than an outer diameter of the tool body. That is, no part of the modular resistivity sensor 100 protrudes or extends radially outward beyond the diameter of the tool body outer surface. Therefore, in the instance that the tool body or drillstring include any type of component at a radial distance beyond an outer surface of the tool body 50 (e.g., a stabilizer), the modular resistivity sensor is disposed on the tool body at a different location from the component (e.g., stabilizer), and not on the component. That is, the modular resistivity sensor is not disposed on a stabilizer, nor is it required to be. A sensor pocket 52 extending radially inward from the outer surface is formed in the tool body 50. The sensor pocket 52 may be any shape and may be formed in a groove that is cut in the tool body 50, or formed directly in the outer surface. For tool face reference, the modular resistivity sensor 100 may be aligned to a scribe line on the tool body surface (not shown). Wire ways may extend within the tool body 50 for power and/or signal communication between the modular resistivity sensor 100 and other electronics units within the tool body or drillstring.

A sensor cover 54 may be placed over the installed modular resistivity sensor 100 and attached to the tool body 50 to prevent the sensor 100 from being damaged during the drilling process. The sensor cover 54 may be made of abrasion-resistant steel, such as satellite, or other materials. The sensor cover 54 further includes slots or windows 56 extending through an outer wall. For maximum transmission of electromagnetic energy across the sensor cover 54, the slots 56 may be substantially aligned along the direction of magnetic moments generated by respective coil antennas underneath. For example, for a coil antenna generating a magnetic moment parallel with a longitudinal axis 51 of the tool body 50, the slots 56 may be substantially aligned parallel to the longitudinal axis 51 of the tool body 50. Further, the slots 56 may be filled with non-conducting material such as rubber, PEEK, fiberglass, or ceramic. In those instances when the modular resistivity sensor is housed within a tube (shown in FIG. 3), preferably the tube slots 109 are substantially aligned with the sensor cover slots 56.

Methods of using the modular resistivity sensor include measuring formation resistivity of a formation, making azimuthal resistivity measurements, and using the sensor with other sensors and downhole tools. Measuring formation resistivity includes applying or generating a sinusoidal electromagnetic wave of current to the transmitting coil antenna. The frequency of the sinusoidal wave may be between 100 kHz and 1 GHz. A voltage signal is measured independently from each receiving coil antenna, which may be expressed as $V_1$ and $V_2$, respectively. A voltage signal difference may be calculated from $V_1$ and $V_2$ as:

$$V = V_2 - \alpha V_1 \qquad \text{(Equation 1)}$$

where α is a scaling factor. The value of a may be chosen so that the voltage signal difference V becomes zero when the measurement is taken in air. Voltage is a complex quantity having both in-phase and out-of-phase components, both of which may contain information about the formation resistivity. For example, when using the in-phase component of V, $R_e(V)$ to derive an apparent formation resistivity, the following equation is used:

$$R_a = k \frac{\text{Re}(V)}{I} \quad \text{(Equation 2)}$$

where k is a proportionality factor. A value of k may be chose using a numerical model. In the model, a tool body containing the resistivity sensor is placed in a wellbore centered about the axis of a wellbore. The formation is assumed to be uniform with a resistivity value of $R_t$ and the mud resistivity is the same as $R_t$. The voltage signal difference V for a given driving current I applied to the transmitting coil antenna may be calculated. Finally, k may be calculated as:

$$k = R_t \frac{I}{\text{Re}(V)} \quad \text{(Equation 3)}$$

It is also possible to use the ratio of $V_2$ to $V_1$ to derive a parameter of the surrounding formation. This may be done by defining two new quantities, attenuation ("AT") and phase difference ("PD"), defined as:

$$AT = -20\log\left|\frac{V_2}{V_1}\right| \quad \text{(Equation 4)}$$

$$PD = \tan^{-1}\left(\frac{V_2}{V_1}\right) \quad \text{(Equation 5)}$$

Surrounding medium (e.g., drilling mud) and free space may contribute to the AT and PD quantities, and preferably such contributions to the quantities are discarded by performing an "air hung" calibration. That is, both AT and PD quantities are measured with the sensor hung in air, away from any conductors that may interfere with the measurement. The air hung measurements are then subtracted from subsequent downhole measurements as follows:

$$AT^* = AT - AT^{air} \quad \text{(Equation 6)}$$

$$PD^* = PD - PD^{air} \quad \text{(Equation 7)}$$

The above discussion focuses on a single transmitting antenna. In case two transmitting antennas are used, average attenuation and phase difference measurements may be produced from the individual transmitting antennas. It has been well known that the average attenuation and/or phase difference measurement helps remove electronic noises and borehole effects on the measurement.

Apparent resistivities may be derived from both AT* and PD* using the following equations:

$$R_a^{AT} = k^{AT} AT^* \quad \text{(Equation 8)}$$

$$R_a^{PD} = k^{PD} PD^* \quad \text{(Equation 9)}$$

where $k^{AT}$ and $k^{PD}$ are proportionality factors. Methods of finding these factors are well known and will not be detailed here. For instance, they can found through numerical modeling.

Measurements taken as described above may be subject to errors, including those from electronics noises, thermal drifts in the electronics, and deformation and/or material properties changes of the antennas. Random errors may be removed or suppressed by time averaging. However, systematic errors, such as those from thermal drifts and antenna deformation, may not be reduced by time averaging. In this instance, compensating for systematic errors may include using a calibrating device, such as the calibrating antenna shown in FIG. 4. A current is driven to the calibrating antenna at a desired frequency and the attenuation and phase difference between the receiving antennas is measured as follows:

$$AT^{Cal} = -20\log\left|\frac{V_2^{Cal}}{V_1^{Cal}}\right| \quad \text{(Equation 10)}$$

$$PD^{Cal} = -\tan^{-1}\left(\frac{V_2^{Cal}}{V_1^{Cal}}\right) \quad \text{(Equation 11)}$$

where the subscripts "1" and "2" have the same meaning as above. Next, the attenuation and phase difference measurements from equations (10) and (11) are subtracted from the air-calibrated measurements as follows:

$$AT^{**} = AT^* - AT^{Cal} \quad \text{(Equation 12)}$$

$$PD^{**} = PD^* - PD^{Cal} \quad \text{(Equation 13)}$$

Apparent formation resistivities may then be calculated from AT and PD as in equations (8) and (9).

Figure 6:
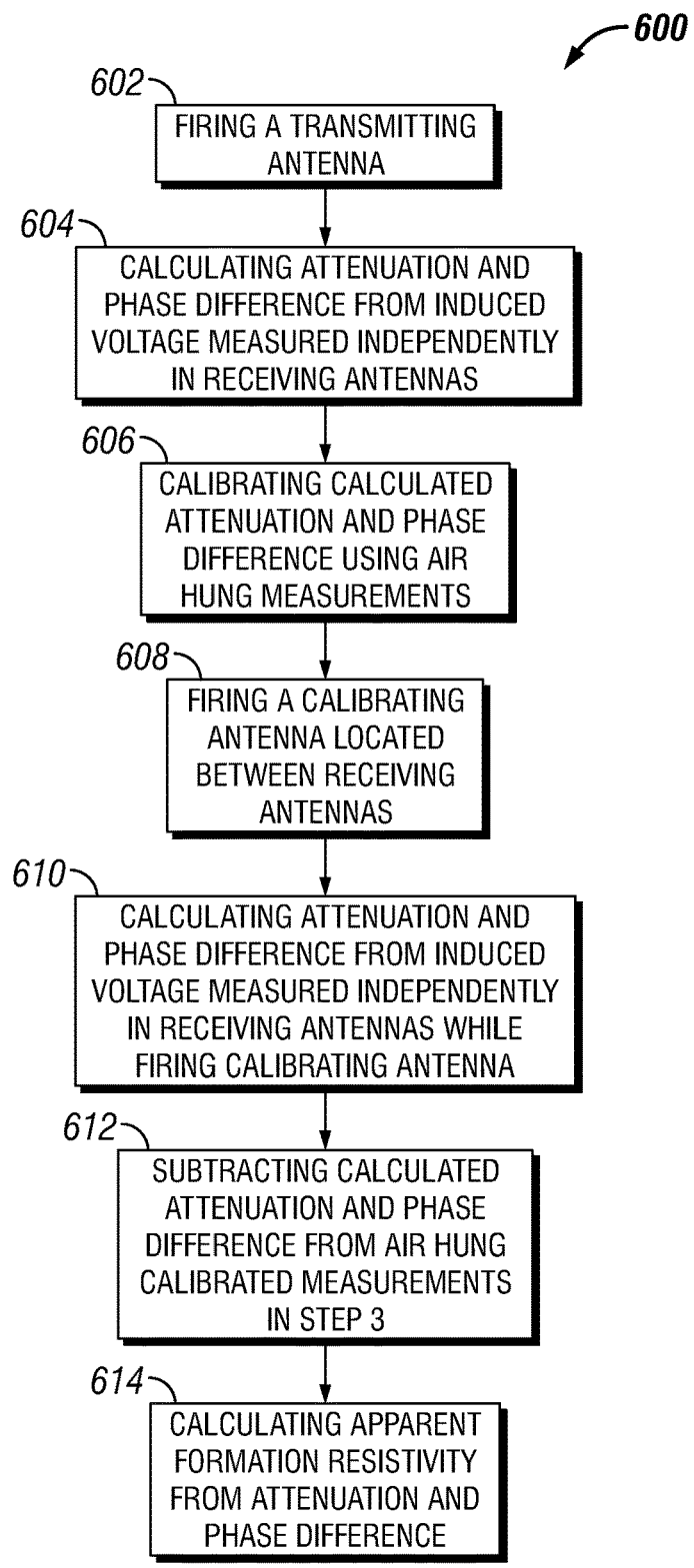
FIG. 6 illustrates a flowchart showing a method of using the modular resistivity sensor.

FIG. 6 illustrates a flowchart showing a method of using the modular resistivity sensor in accordance with the above description. The method includes firing a transmitting antenna (Step 602), calculating attenuation and phase difference from induced voltage measured independently in receiving antennas (Step 604), and calibrating the calculated attenuation and phase difference using air hung measurements (Step 606). The method further includes firing a calibrating antenna located between receiving antennas (Step 608), calculating attenuation and phase difference from induced voltage measured independently in receiving antennas while firing the calibrating antenna (Step 610), and subtracting the calculated attenuation and phase difference from the previous air hung calibrated measurements (Step 612). Finally, the method includes calculating apparent formation resistivity from attenuation and phase difference (Step 614).

In other embodiments, a calibrating signal generator may be used. The signal generator generates a calibrating signal (e.g., voltage) at a desired frequency and feeds the signal to the electronics that take measurements from the two receiving antennas. The calibrating attenuation and phase difference are then calculated in the manner discussed above. In this case, the calibrating attenuation and phase difference may account for variations in the receiving electronics but not necessarily in the receiving antennas because the receiving antennas may be bypassed.

Methods of using the modular resistivity sensor also include making azimuthal resistivity measurements. A tool face sensor records the tool face angle as the tool body rotates and the modular resistivity sensor makes azimuthal measurements of formation resistivity. The tool face sensor may be a magnetometer, an accelerator, a gyro scope or other known tool face sensors. The resistivity measurements taken by the modular resistivity sensor may then be correlated with the tool face angle measurements to produce a resistivity image as a function of tool face and a function of wellbore depth.

Figure 7:
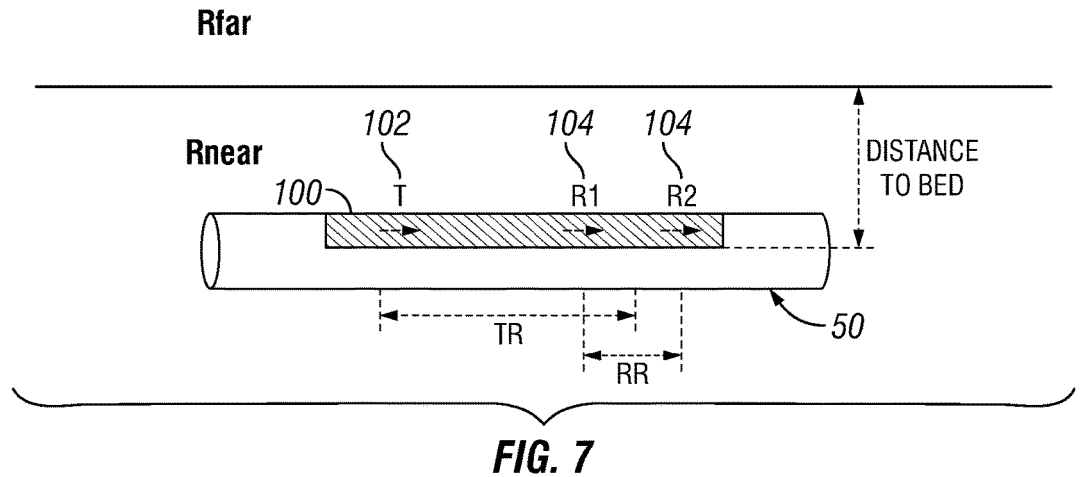
FIG. 7 illustrates a representative computer model showing azimuthal resolution by a modular resistivity sensor placed parallel to a formation bed.

FIG. 7 illustrates a computer model for azimuthal resolution of the side-mounted modular resistivity sensor placed parallel to a formation bed boundary. 'T' indicates the transmitting antenna and 'R1' and 'R2' indicate receiving antennas. Both attenuation and phase difference are measured between the two receiving antennas. The front side of the modular sensor is defined as one facing the bed boundary and the back side faces the opposite direction. Differences in the attenuation and/or phase difference measurements between the front and the back sides of the modular sensor indicates the azimuthal resolution. The larger the difference, the better azimuthal resolution the sensor provides.

Figure 8:
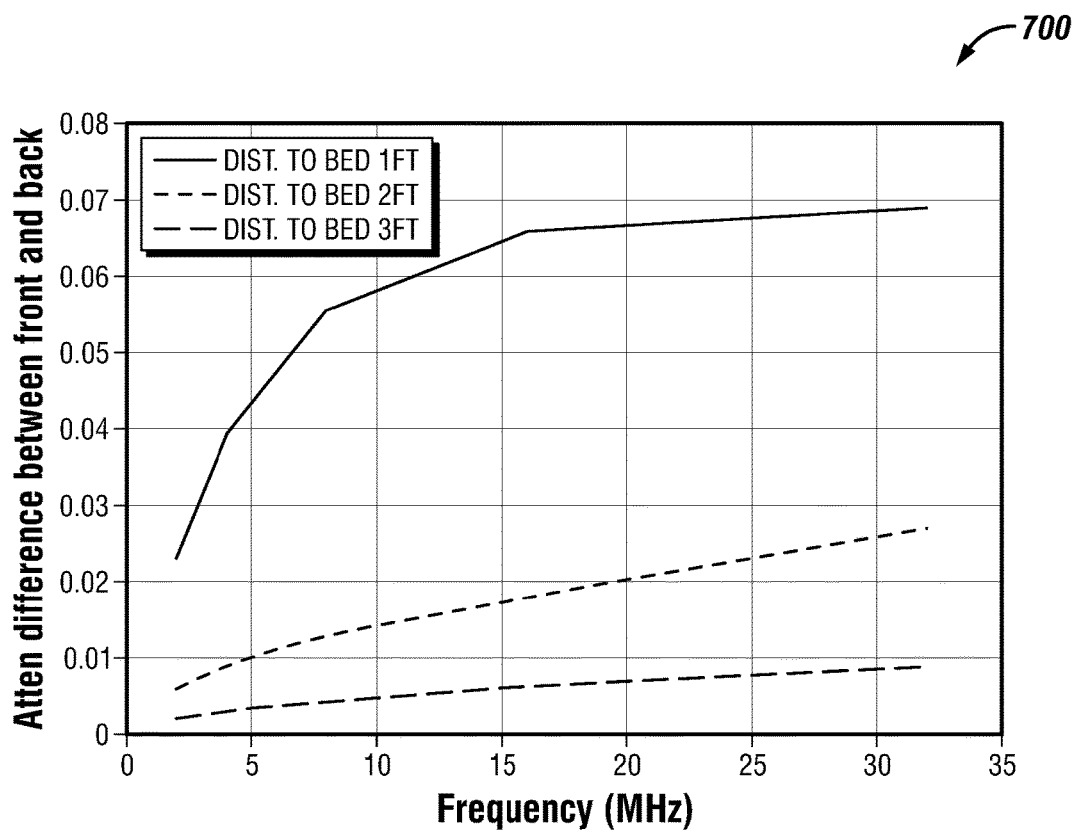
FIG. 8 illustrates a graph showing the differences in the attenuation measurements (in dB) in the presence of a bed boundary separating a 1-ohmm bed from a 100-ohmm bed with the sensor in the 100-ohmm bed.

FIG. 8 illustrates a graph showing the differences in the attenuation measurements (in dB) in the presence of a bed boundary separating a 1-ohmm bed from a 100-ohmm bed with the sensor in the 100-ohmm bed. In this example, a tool body having a diameter of five inches, a transmitting coil antenna spaced eight inches from a center of the receiving coil antennas, and receiving coil antennas spaced four inches apart was used. As shown, azimuthal resolution of the sensor improves with increasing frequency, and decreases as the distance to the bed boundary increases. Also, a front side of the sensor measures higher attenuation than the back side, which is expected because the front side faces the more conductive bed. Hence, by measuring the tool face angles corresponding to the front and the back sides, it is possible to determine the azimuthal direction of the bed boundary relative to the tool.

Azimuthal resistivity measurements may also be taken without tool body rotation. To do so, multiple modular resistivity sensors may be azimuthally-spaced about a circumference of the tool body. The modular sensors are spaced apart by known tool face angles. A representative choice of the azimuthal separation angle may be 90 degrees, or at least 30 degrees, or at least 45 degrees. The multiple modular sensors may be controlled by a micro-controller to take measurements independently.

Figure 9:
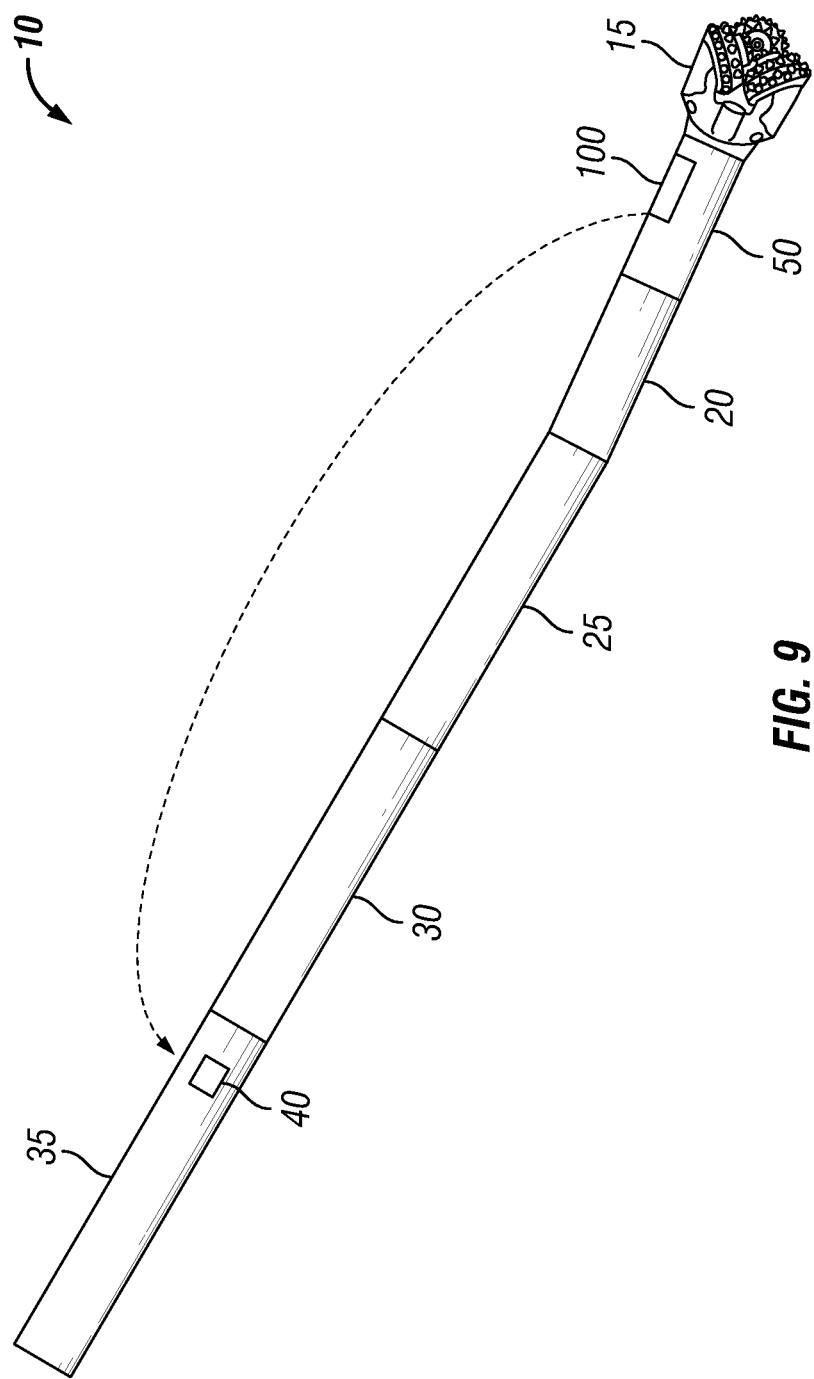
FIG. 9 illustrates an embodiment of a modular resistivity sensor combined with other sensors in a drillstring.

FIG. 9 illustrates an embodiment of the modular resistivity sensor 100 combined with other sensors in a drillstring 10. The exemplary embodiment shown may be used for resistivity measurement-while-drilling ("MWD"). The drillstring 10 includes a drill bit 15 on a distal end and a modular resistivity sensor 100 located behind the drill bit 15. An MWD sub 35 including a tool face measurement sensor 40 is located behind the drill bit 15 spaced apart from the modular resistivity sensor by a mud motor 25 and/or other downhole tools (e.g., bent sub 20, LWD tool string 30). The modular resistivity sensor 100 may measure azimuthal resistivity of the formation while the tool rotates and the sensor 40 may measure tool face data. The azimuthal resistivity measurements are then transmitted (shown by dashed lines indicating communication) to the MWD sub 35 for further transmission to the surface. In other embodiments, azimuthal resistivity may be measured without a tool face sensor at the bit. To do so, the modular resistivity sensor 100 and the MWD sub 35 are first synchronized in time (e.g., at surface). Once downhole, the modular resistivity sensor 100 takes resistivity measurements while the MWD sub 35 measures tool face angles independently. The resistivity measurements with time stamps are transmitted through short-hop telemetry to the MWD sub 35 where the time stamps are converted to tool face stamps.

In another embodiment, a modular resistivity sensor is combined with another resistivity sensor (e.g., modular or non-modular) to make resistivity measurements. A modular resistivity sensor, having at least one transmitting antenna and/or at least one receiving antenna, is directly at or proximate to the drill bit. The second or additional resistivity sensor is located farther behind the drill bit than the modular resistivity sensor, and spaced apart from the modular resistivity sensor by other downhole components (e.g., a mud motor and a bent sub). The second resistivity sensor has at least one transmitting antenna and at least one receiving antenna. In operation, the transmitting antenna on the second resistivity sensor sends an electromagnetic signal to the surrounding formation which is detected by the receiving antenna in the modular resistivity sensor. The received signal may be processed locally by a processor at the bit or transmitted via short-hop telemetry to the second resistivity sensor for processing.

In making an azimuthal resistivity measurements, tool face angles may be measured with a sensor located either at the bit or near the second resistivity sensor. In case the portion of the BHA containing the second resistivity sensor does not rotate or does not rotate at the same speed as the modular resistivity sensor does, the tool face sensor may be located at or proximate to the drill bit or in any portion of the BHA that rotates at the same speed as the modular resistivity sensor does and the modular resistivity sensor has at least one transmitting and/or receiving antenna whose magnetic moment is generated in a direction not parallel to the longitudinal axis of the tool sub.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. A resistivity-measuring sensor disposable within a drillstring, the sensor comprising:
   a sensor body having a longitudinal axis,
   wherein the sensor body is separable from and disposable entirely within the drillstring at a radially offset distance from the longitudinal axis of the drillstring;
   a transmitting antenna disposed along a length of the sensor body;
   a receiving antenna disposed along a length of the sensor body; and
   an electronics section contained within the sensor body for generating and receiving signals to and from the transmitting and receiving antennas.

2. The sensor of claim 1, wherein at least one antenna is configured to generate magnetic moments parallel with the longitudinal axis of the sensor body.

3. The sensor of claim 1, wherein at least one antenna is configured to generate magnetic moments misaligned with the longitudinal axis of the sensor body.

4. The sensor of claim 1, further comprising a calibrating device configured to calibrate signals generated from the receiving antennas.

5. The sensor of claim 4, wherein the calibrating device comprises a signal generator configured to generate a voltage signal at a desired frequency.

6. The sensor of claim 4, wherein the calibrating device comprises an antenna configured to generate a voltage signal at a desired frequency in the receiving antennas.

7. The sensor of claim 4, wherein the calibrating device is substantially equally spaced between a pair of receiving antennas.

8. The sensor of claim 1, wherein at least part of the sensor body comprises a non-conducting material.

9. The sensor of claim 1, further comprising circumferential grooves in an outer surface of the sensor body, each groove having an insulating layer deposited therein on which the antennas are wound.

10. The sensor of claim 1, further comprising a sensor cover that fits over the sensor body, wherein at least part of the sensor cover comprises a non-conducting material.

11. The sensor of claim 10, wherein the sensor cover further comprises one or more slots aligned substantially along a direction of magnetic moments generated by respective antennas underneath.

12. The sensor of claim 1, wherein a radially outermost surface of the sensor body is at a distance from the longitudinal axis of the drillstring substantially equal to or less than an outer diameter of the drillstring.

13. The sensor of claim 1, further comprising a tool face measurement sensor configured to measure the angular position of the drillstring relative to the wellbore.

14. The sensor of claim 1, further comprising multiple sensor bodies disposed in drillstring pockets, wherein electromagnetic signals are transmitted and received at multiple antennas on the multiple sensor bodies.

* * * * *